US009651385B2

(12) United States Patent
Nair et al.

(10) Patent No.: US 9,651,385 B2
(45) Date of Patent: *May 16, 2017

(54) PROVIDING A ROUTE THROUGH A PREDEFINED SPACE

(71) Applicant: CERNER INNOVATION, INC., Kansas City, KS (US)

(72) Inventors: Kapil Raj Nair, Silver Spring, MD (US); Vinod Mohanan, Washington, DC (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,416

(22) Filed: Sep. 22, 2015

(65) Prior Publication Data

US 2017/0082444 A1    Mar. 23, 2017

(51) Int. Cl.
G01C 21/20     (2006.01)

(52) U.S. Cl.
CPC ................. G01C 21/206 (2013.01)

(58) Field of Classification Search
CPC   G01C 21/3446; G01C 21/34; G01C 21/3461; G01C 21/32; G06Q 10/047
USPC ......................................................... 701/533
See application file for complete search history.

(56) References Cited

U.S. PATENT DOCUMENTS

| 6,119,065 | A | 9/2000 | Shimada et al. |
|---|---|---|---|
| 8,046,163 | B2 | 10/2011 | Rashid |
| 8,433,344 | B1 | 4/2013 | Virga |
| 9,157,758 | B2 | 10/2015 | Van Seggelen et al. |
| 9,217,648 | B2 | 12/2015 | Huck et al. |
| 9,322,657 | B2 | 4/2016 | Friedlander et al. |
| 2002/0077749 | A1 | 6/2002 | Doi |
| 2002/0087262 | A1 | 7/2002 | Bullock et al. |
| 2005/0256885 | A1 | 11/2005 | Yairi et al. |
| 2009/0157302 | A1 | 6/2009 | Tashev et al. |
| 2010/0021012 | A1 | 1/2010 | Seegers et al. |
| 2010/0023250 | A1 | 1/2010 | Mays et al. |
| 2010/0023252 | A1 | 1/2010 | Mays et al. |
| 2010/0299065 | A1 | 11/2010 | Mays |
| 2013/0085671 | A1 | 4/2013 | Friedlander et al. |
| 2014/0372032 | A1 | 12/2014 | Canner et al. |
| 2016/0111007 | A1 | 4/2016 | Dennerline |

OTHER PUBLICATIONS

Non-Final Office Action dated Jul. 28, 2016 in U.S. Appl. No. 14/861,433, 8 pages.
Notice of Allowance dated Dec. 12, 2016 in U.S. Appl. No. 14/861,433, 10 pages.

*Primary Examiner* — Maceeh Anwari
(74) *Attorney, Agent, or Firm* — Shook, Hardy & Bacon L.L.P.

(57) ABSTRACT

Methods, systems, and computer-readable media are provided to determine a route through a predefined space. A first path from a source location to a common path within the space is determined, as well as a second path from a destination location a common path. If a shared path, which is the part of the first path which overlaps a portion of the second path, exists, it is excluded. If any portion of the common path separates the first and second path, it is included. A route is returned which is the combination of the remaining path segments.

20 Claims, 11 Drawing Sheets

PROVIDING A ROUTE THROUGH A PREDEFINED SPACE

CROSS REFERENCE TO RELATED APPLICATION

This application is related by subject matter to commonly assigned U.S. patent application Ser. No. 14/861,433 entitled "PROVIDING A ROUTE THROUGH A PREDEFINED SPACE" filed concurrently herewith on the same date and incorporated in this application by reference in its entirety.

BACKGROUND

In many facilities, such as hospitals and military installations, the ability to quickly and efficiently navigate to a destination is critical. Additionally, certain areas, which may otherwise be part of the most direct route in terms of distance, may be secured areas that are not accessible to the general public. Examples of secured areas may include operating rooms and quarantine wards.

Traditional mapping and routing methods can become computationally intense by constructing multiple routes, calculating a value which represents the desirability of a given route based on the distance and other considerations (such as number of turns, traffic capacity, accessibility, etc.) of multiple candidate routes, and then comparing candidates to determine the optimal route. Additionally, either inside or outside of a building, routes are typically determined for a user based on the distance and time it would take the user to get from a first location to a second location.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the present invention are directed to determining a route through a building, facility, or other predefined space. Rather than creating a complex model of the facility in order to recalculate and evaluate the desirability of possible routes on every query, embodiments described herein first predefine a path that is the single preferred path to a destination and storing this path to a database. As predefining a route for every combination of two locations within the space would be computationally intense and time consuming, in one embodiment, a path may be predefined for every location to a corresponding common junction point on a common path. By comparing the path from a source location to its corresponding junction point with the path from the destination location to its corresponding junction point, the single preferred route between the source location and the destination can be efficiently determined. In other embodiments, subpath junction points between a source location and a common junction point on the common path or between a destination location and a common junction point on the common path may be used to determine the route from the source location to the destination location to return to the user. In embodiments described herein, the route identified from the source location to the destination location is not identified based on a shortest distance or a shortest amount of time it would take the user to get from the source location to the destination location, as has been traditionally used in other route determination systems. Instead, certain factors associated with the user, such as the user's security level within the predefined space, the user's mode of transportation (walk/wheelchair/scooter), the presence of an existent emergency condition, etc., are used to identify the route for the user to take from the source location to the destination location.

BRIEF DESCRIPTION OF THE DRAWINGS

The present invention is described in detail below with reference to the attached drawing figures, wherein.

DETAILED DESCRIPTION

Figure 1:
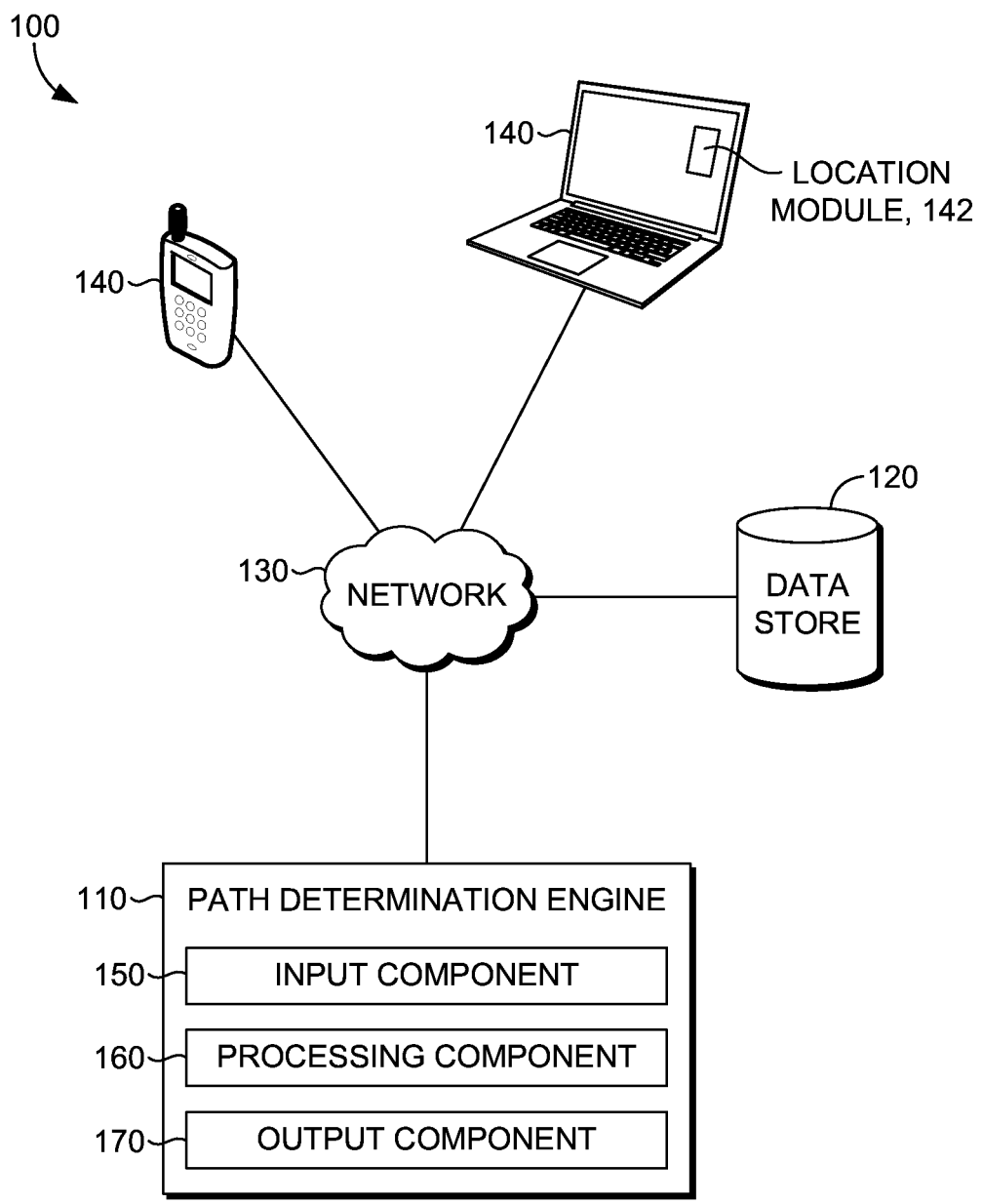
FIG. 1 is a block diagram of an exemplary computing environment suitable to implement embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of the methods employed, the terms should not be interpreted as implying any particular order among or between various steps herein disclosed unless and except when the order of individual steps is explicitly described.

Embodiments of the present invention provide for systems, methods, and computer storage media for determining a route through a predefined space. In embodiments, the present invention provides routes between locations, such as a source location and a destination location provided by a user, within a facility or other predefined space while keeping computational load to a minimum.

Many facilities, such as hospitals and military installations, can be complex, having many different locations which may be difficult to locate for persons unfamiliar with the layout. At any given time, there may be a great number of persons within a facility who are in need of directions from their current location to a destination within the facility. Additionally, there may be locations within the facility that are off-limits to persons lacking the requisite clearance. Therefore, embodiments are provided that compute a path between any two locations within a facility or other predefined space, the path being determined or optimized based on, for example, a person's clearance, mode of transportation, events occurring within the facility, an emergency condition within the facility, etc., while keeping the computational load for each query to a minimum in order to accommodate a large number of potential users.

As mentioned, while many routing systems use distance and traveling time as the main factors in determining the best route to return to a user, in embodiments herein, time and distance are not used in determining the route, or in other embodiments, are used but are not the main factors. For exemplary purposes only, hospitals have many disadvantages when it comes to easily navigable spaces. In buildings such as hospitals, there are many areas that are off-limits to visitors, patients, and even some staff. There are areas that are secured and only accessible to certain personnel, including clinicians and other employees that work in those areas. As such, determining a route for a user to get from a starting point or current location, referred to herein as a source location, to a destination location is not as simple as determining the shortest or quickest route. Many other factors may be helpful for determining a route within a building, such as a hospital. For example, some visitors and patients may be unable to walk to get to the destination location. Instead, wheelchairs, scooters, etc. may be utilized by these individuals. As such, a route may take this into consideration, as stairs may be avoided in these situations. Emergent situations within the hospital may also cause a route to be identified over a different but otherwise available route.

Accordingly, one aspect is directed to one or more computer storage media storing computer-usable instructions that, when used by one or more computing devices, cause the one or more computing devices to perform a method. The method includes, upon receiving a source location and destination location from among the set of locations, determining a first path from the source location to a corresponding common junction point on a common path and a second path that is a path from the destination location to a corresponding common junction point on the common path. The method further includes determining a shared path that is found in both the first path and the second path and returning a route from the source location to the destination location which is a combination of the first path and the second path excluding the shared path.

Another aspect is directed to a system for providing directions through a predefined space. The system includes an input device that receives a source location and a destination location. The system further includes a computing device, having a memory and one or more processors, and a data store containing a path from each location to a corresponding common junction point on the common path. The computing device, upon receiving a source location and a destination location from an input device, identifies within the data store a first path from the source location to a corresponding common junction point on a common path and a second path from the destination location to a corresponding common junction point on the common path. The computing device further determines a shared path that is part of the first path and the second path. This shared path is redundant to both paths, and therefore represents the portion of the path which would not be traversed when traveling from the source location to the destination location. Upon determining the shared path, the computing device combines the portion of the source location path and the destination location path, excluding the shared path, into a route leading from the source location to the destination location. The system further includes an output device which returns the route from the source location to the destination location.

In yet another aspect, a computerized method is provided for determining a route through a predefined space. The method may be carried out by one or more servers having at least one processor. A first step is to identify a first subpath from a source location to a first junction point and a second subpath from a destination location to second junction point. Next, a shared path, which is the part of the first path which is also part of the second path, is determined. Then a route from the source location to the destination location is defined by combining of the first subpath and the second subpath and, if any, a portion of the common path connecting the first junction point and the second junction point while excluding the shared path.

In yet another aspect, a computerized method is provided for determining a route through a predefined space. The method may be carried out by one or more servers having at least one processor. A first step is to determine whether a source location and destination are both on a common path. If they are both on the common path, the method returns a route from the source location to the destination location along the common path.

If one of the locations is not on the common path, the method determines which location is on the common path and identifies a subpath on which the other location can be found. The subpath has a corresponding junction point which either lies on the common path or on a parent subpath. If the corresponding junction point is not on the common path it is on a parent subpath. The parent subpath, in turn has a corresponding junction point, generally located on the common path. In principle, the parent subpath could itself have a parent subpath, and so on, but for computational efficiency and simplicity it is better to define the paths through a space such that the number of junction points and subpaths require to arrive at a location is limited. Finally, the path from the corresponding common junction point to the location on the common path is determined.

In yet another embodiment, one or more computer storage media storing computer-useable instructions are provided that, when used by one or more computing devices, cause the one or more computing devices to perform a method. The method includes receiving a source location and a destination location, and determining a pair of corresponding common junction points on a common path which correspond to the source location and the destination location, respectively. The method then identifies a portion of the common path connecting the pair of corresponding junction points.

In returning a route, the method may return only the portion of the common path that connects the pair of corresponding common junction points. This might be the case when the source location and the destination location are common junction points (i.e. the source location and the destination location both lie on the common path). However, the route returned may also include a subpath that connects the source and/or destination location to the corresponding common junction point. The subpaths themselves may be made up of child subpaths and parent subpaths, such that a location along a child subpath corresponds to a subpath junction point on the parent subpath (e.g., the subpath junction point is a location that connects the child subpath to the parent subpath).

In yet another aspect, a system is provided for providing directions through a predefined space. The system includes an input device that receives a source location and destination location within a predefined space. The system further includes a data store containing a common path, a set of locations within the predefined space, a set of common junction points along the common path, and at least on subpath. Additionally, the system includes a computing device, having a memory and one or more processors, which upon receiving a source location and a destination location identifies within the data store a first common junction point corresponding to the source location and a second common junction point corresponding to the destination location and determines if any subpath exists connecting the first common junction point to the source location and/or connecting the second common junction point to the destination location. The system further includes an output device that returns a route from the source location to the destination location.

Having briefly described embodiments of the present invention, an operating environment suitable for use in implementing embodiments of the present invention is described below. Referring to the drawings in general, and initially to FIG. 1 in particular, an exemplary computing system environment, such as a web-hosted application deployment computing system environment, on which embodiments of the present invention may be implemented is illustrated and designated generally as system 100. It will be understood and appreciated by those of ordinary skill in the art that the illustrated system 100 is merely an example of one suitable computing environment and is not intended to suggest any limitation as to the scope of use or functionality of the invention. Neither should the system 100 be interpreted as having any dependency or requirement relating to any single component or combination of components illustrated therein.

Embodiments described herein may be operational with numerous other general-purpose or special-purpose computing system environments or configurations. Examples of well-known computing systems, environments, and/or configurations that may be suitable for use with the present invention include, by way of example only, personal computers, server computers, handheld or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Embodiments described herein may be described in the general context of computer-executable instructions, such as program modules, being executed by a computer. Generally, program modules include, but are not limited to, routines, programs, objects, components, and data structures that preform particular tasks or implement particular abstract data types. Embodiments may also be practiced in distributed computing environments where tasks are performed by remote processing devices that are linked through a communication network. In a distributed computing environment, program modules may be located in local and/or remote computer storage media including, by way of example only, memory storage devices.

With continued reference to FIG. 1, the exemplary system 100 includes a path determination engine 110. The path determination engine 110 may be a specialized computing device programmed with a set of computer-useable instructions to perform a particular route determination function. Components of the path determination engine 110 not shown in FIG. 1 may include, without limitation, a processing unit, internal system memory, and a suitable system bus for coupling various system components, including a data store 120, with the path determination engine 110. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standard Association (VESA) local bus, and Peripheral Component Interconnect (PCI) bus, also known as Mezzanine bus.

The path determination engine 110 typically includes, or has access to, a variety of computer-readable media, for instance, data store 120. Computer-readable media can be any available media that may be accessed by the path determination engine 110. By way of example, and not limitation, computer-readable media my include computer storage media and communication media. Computer storage media may include, without limitation, volatile and non-volatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other hardware memory technology, CD-ROM, digital versatile disks (DVDs) or other optical disk storage, magnetic cassettes, magnetic tape, magnetic disk storage, or other magnetic storage device, or any other hardware medium which can be used to store the desired information and which may be accessed by the path determination engine 110. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including data store 120, provides storage of computer-readable instructions, data structures, program modules, and other data for the path determination engine 110, including precomputed routes from one location to another.

The path determination engine 110 may operate in a computer network 130 using logical connections to one or more remote computing devices, such as computing device 140. The remote computing devices 140 may be located at a variety of locations in a building, facility, or other predefined space. The remote computing device 140 may also be physically located outside of the predefined space. The remote computing device 140 may be personal computer, servers, routers, network PCs, peer devices, other common network nodes, or the like, and may include some or all of the components described above in relation to the path determination engine 110. Additionally, the remote computing device 140 may have a location module 142 which provides location information relating to the remote computing device 140 to the input component 150 of the path determination engine 110. The remote computing devices 140 can be personal digital assistants or other like devices. It is contemplated that many computing devices could be utilized in conjunction with the path determination engine 110, and may even be used simultaneously or sequentially to request a route from a source location to a destination location.

Exemplary computer network 130 may include, without limitation, local area networks (LANs) and/or wide area networks (WANs). Such networking environments are commonplace in offices, enterprise-wide computer networks, intranets, and the Internet. In a networked environment, program modules or portions thereof may be stored in the path determination engine 110, in the data store 120, or on any of the remote computing device 140. It will be appreciated by those of ordinary skill in the art that the network connections shown are exemplary and other means of establishing a communications link between the computers (e.g., path determination engine 110 and remote computing device 140) may be utilized.

In operation, a user may enter commands and information into the path determination engine 110 via one or more remote computing devices, such as remote computing device 140 through an input device associated with the remote computing device 140, such as a keyboard, a pointing device (commonly referred to as a mouse), a track ball, or a touch pad, which are received at the input component 150. Other input devices may include, without limitation, microphones, satellite dishes, scanners, or the like. The processing component 160 receives information and commands from the input component 150 and uses computer-useable instructions to perform a particular route determination function. Commands and information may also be sent directly from a remote computing device 140 to the processing component 160 of the path determination engine 110. In addition to a monitor, remote computing device 140 may include other peripheral output devices, such as speakers and a printer. Likewise, the output component 170 of the path determination engine 110 may include a monitor, speakers, a printer, or other peripheral output devices.

Although many other internal components of the path determination engine 110 and the remote computing device 140 are not shown, those of ordinary skill in the art will appreciate that such components and their interconnection are well known. Accordingly, additional details concerning the internal construction of the path determination engine 110 and the remote computing device 140 are not further discussed herein.

Figure 2:
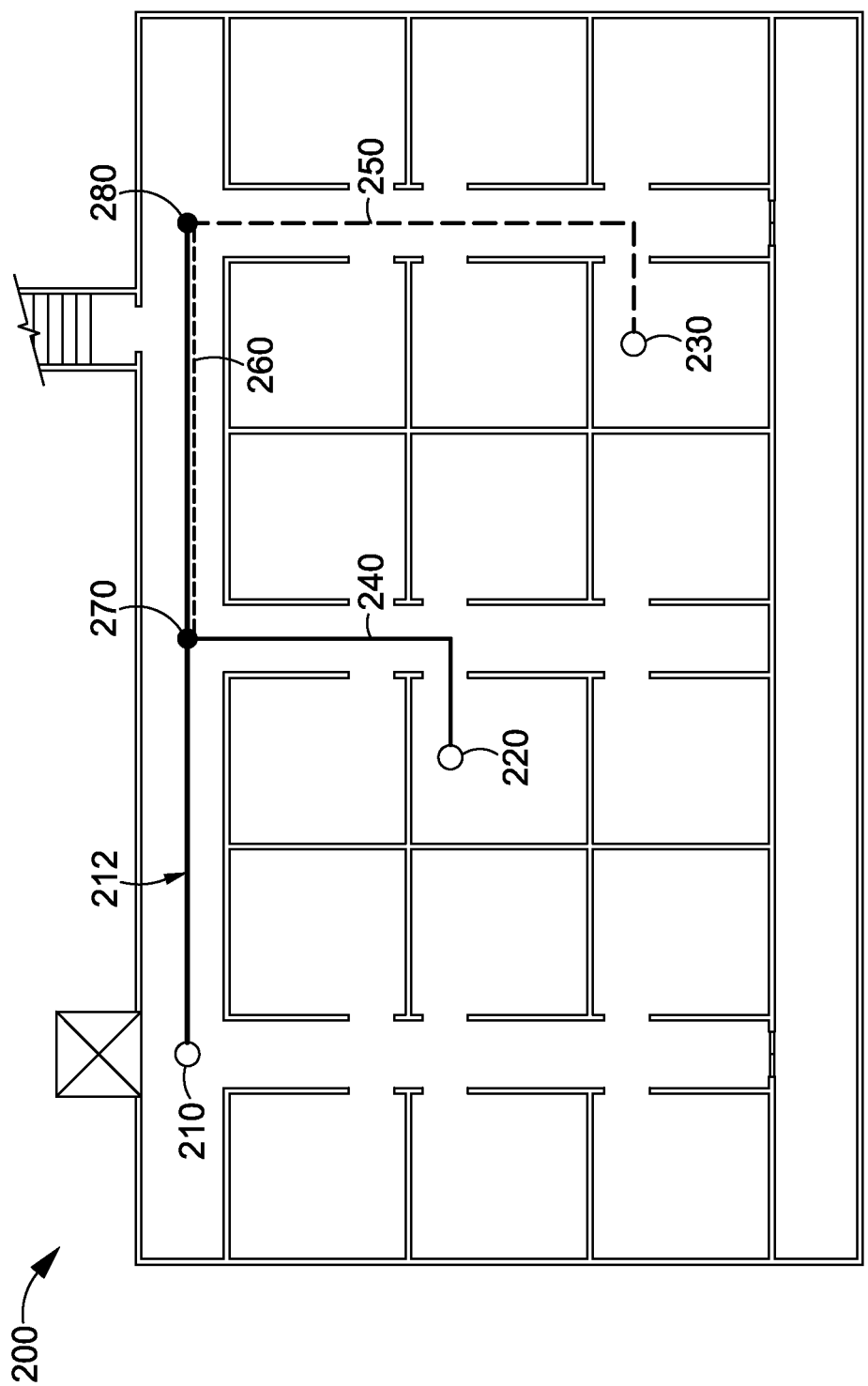
FIG. 2 is an exemplary visualization of a method of providing a route through a predefined space, in accordance with an embodiment of the present invention.

Turning to FIG. 2, an exemplary floor plan 200 is shown for visualization of a method of providing a route through a predefined space. Floor plan 200 may be within the confines of a building, facility, or other predefined space. A building, facility, or other predefined space may consist of one or more similar floor plans 200, and may be within a separate structure within a complex and/or may be on separate vertical levels within the same building.

The floor plan 200 includes an origin node 210 which is a fixed reference location within the floor plan 200. The origin node 210 may correspond to a location of high visibility, such as an atrium, sculpture, or other work of art, information kiosk, or security desk. The origin node 210 may, alternatively, correspond to a heavy traffic location, such as a main entrance, elevator, stairwell, escalator, hyphen, arcade, or courtyard. In embodiments, the origin node is selected when the system is implemented so that the pre-computations can be made, including computations of paths from various locations to the origin node. In some embodiments, the origin node is simply selected as a location on the common path 212. As used herein, the common path 212 is a main path (e.g., high traffic, includes many highly used locations) through the predefined space. Along the common path 212 there are common junction points 270 and 280. In embodiments, as will be discussed in more detail herein, the common path 212 extends at least from the origin node 210 to some other location along the common path 212, where there exists at least one subpath that branches from the common path 212 between the origin node 210 and the other location on the common path.

Within the floor plan 200 of FIG. 2, there exists a set of locations, including a source location 220 and a destination location 230. Generally, the source location 220 corresponds to a user's current location, such as the location from where the user is requesting directions to the destination location 230. There exists a first path 240 between the source location 220 and common junction point 270. Likewise, there exists a second path 250 between the destination location 230 and common junction point 280. It can be said that common junction point 270 is the corresponding junction point for location 220 and that common junction point 280 is the corresponding junction point for location 230. These paths, in some embodiments, are pre-computed and are stored in a database for future retrieval. In other embodiments, however, these paths may not be pre-computed, but may instead be computed in real-time, such as after a user requests directions to a destination location.

It is noted that in embodiments described herein, the identification of the suggested route from the source location 220 to the destination location 230 may not be based on the fastest path for the user to go from the source location 220 to the destination location 230, and may not be based on the shortest distance between these two points. In fact, in one aspect, the time/distance factor to get from one point to another is not used at all in determining the route. Contrary to traditional systems used to direct someone from a first location to a second location, travel time and distance is not a consideration in aspects described herein. As will be described herein, some factors that might be used to determine the route could include the user's security level, emergency conditions within the building, the user's form of transportation (e.g., walking, wheelchair, use of a walker), etc. However, the time/distance consideration to get form a first location to a second location may not be considered when determining the route.

When determining the route from the source location 220 to the destination location 230, embodiments of the present invention compare the first path 240 and the second path 250. The route from the source location 220 to the destination location 230 is then defined as the combination of the first path 240 and the second path 250 and includes the portion of the common path 260 connecting common junction point 270 and common junction point 280.

In some embodiments, the determination of the course of the common path 212 may be due to physical restraints, such as walls or other barriers, within the predefined space which limits the possible paths to only one single path. The preference for common path 212 may be based on one or more decision criteria, examples of which may include absolute distance, corridor width or capacity, number of turns, landmarks, or reference locations along the path. Additionally, the preference for common path 212 may be conditional or based on one or more factors, examples of which may include a user's security level or the existence of an emergency condition.

In some embodiments, each given location within a space may be represented as an address corresponding to its preferred path to the origin node. In some embodiments, this address may include a full list of locations between the given location and the node, while in other embodiments this address may include only selected locations along the path or simply as a single location which lies along the path from the given location to the origin node. Such a single location along the path is herein referred to as a parent location. In one embodiment, the full path to the origin node from the given location could be fully described by referring to the parent location for the given location and then referencing the parent of the parent location, and so on, until the origin node is referenced. Because, in embodiments, every path terminates at the origin node, in some embodiments, locations whose parent location is the origin node would be given no addressing information, which would implicitly reference the origin node.

In some embodiments, a routing conflict may arise, for instance if a user's security level and form of transportation cannot be resolved. Such a routing conflict could lead to more than one path between a source location and the origin, which could result in a loop forming within the space and causing ambiguity in routing. In such cases, some embodiments of the present invention may rectify the conflict automatically. In on embodiment, when a conflict is detected, the method would resolve the conflict by isolating the loop and measuring the shortest path around the loop from the point where the two paths diverge to the point where the paths come back together. The shortest path may be determined by using the x and y coordinates from scale-rendered map data. As it is only the relative distance that determines which distance is shorter, the scale and units of the paths are not important, only that the map data is scaled uniformly in x and y coordinates.

In one embodiment, the address to each location within a space is determined as follows: first, one path is designated as the common path. The common path is a path which connects the origin node to a location determined to be sufficiently distanced from the origin node for the common path to span the majority of the predetermined space. The common path may fall along a major artery within the space, such as a primary corridor or high traffic route. Any location located on the common path would be addressed to the origin node alone, or in the alternative, given no parent address, thereby implicitly addressing the origin node. Stated another way, a location with no parent address would indicate that the locations lies on the common path.

Next, a first subpath is designated. A subpath may be a path from any location that does not lie along the common path. A subpath may lead from locations along minor hallways or within a specialized wing of the facility that does not receive a great deal of foot traffic. The first subpath may be designated from a location not on the common path, such as a location that is sufficiently far from the origin node to span a significant subsection of the space. For example, a subpath may be designated from a location at the dead end of a hallway, as this subpath would span the length of that hallway. In aspects, a location lying on a subpath would be addressed to the location where the subpath meets the common path. This location where the subpath meets the common path is herein referred to as the common junction point.

Subpaths, as used herein, may refer to a distance that is not all or entirely on the common path. A subpath may be a parent subpath or a child subpath. As used herein, a parent subpath may be closer in distance to the common path than the child subpath, or may at least be a path that leads a user to the common path from the child subpath. As such, additional child subpaths may be designated. A child subpath, and all locations thereon, would address to another subpath, herein referred to as a parent subpath. The child subpath is to the parent subpath as the first subpath, discussed herein above, is to the common path. The location where the child subpath meets the parent subpath is herein referred to as a subpath junction point. A child subpath may have a child subpath of its own, and so on, though for the sake of processing efficiency it would be preferable to minimize the number of such steps in addressing a given location.

Figure 3:
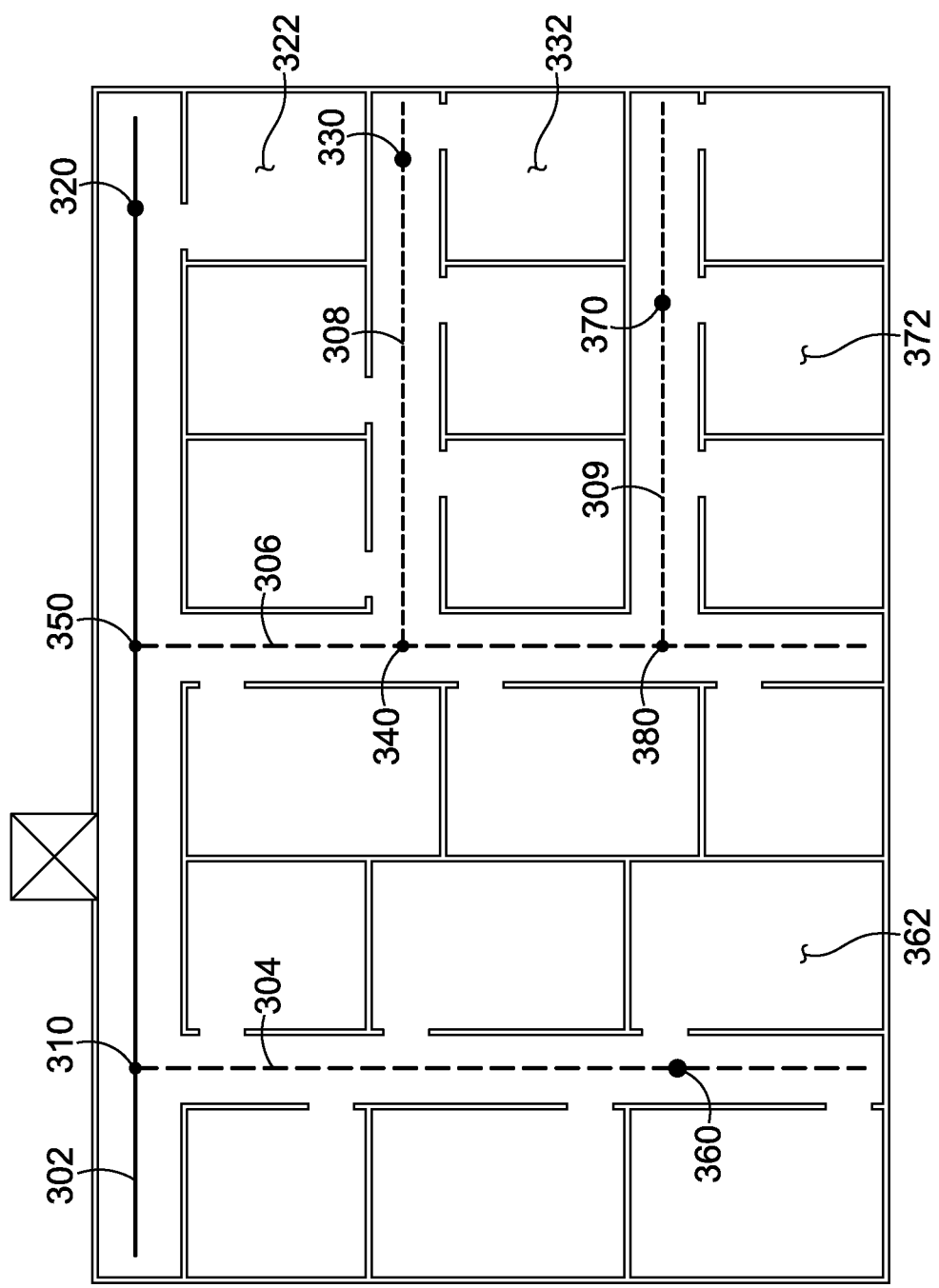
FIG. 3 is an exemplary visualization of a method of providing a route through a predefined space, wherein locations are addressed to a common path and subpaths.

FIG. 3 depicts a space for which the locations therein have been addressed according to a common path 302 and subpaths 304, 306, 308, and 309. Subpath 306 is the parent subpath to child subpaths 308 and 309. Locations 310 and 350 are common junction points on the common path 302, while locations 340 and 380 are subpath junction points on subpath 306. Many different scenarios exist that can be explained with reference to FIG. 3. For example, there may be a scenario in which the source and destination locations are both located on the common path 302. Or, one of the source or destination locations may be located on the common path and the other is on a subpath. Even further, both the source and destination locations may be located on the same or different subpaths. As such, to clearly explain the paths and locations illustrated in FIG. 3, these different scenarios will be described below.

In a first scenario, both the source and destination locations are located on the common path 302. For example, for a source location that is common junction point 310 and a destination location 320, the route is simply the section of the common path 302 connecting location 320 and location 310.

In a second scenario, one location (either the source location or the destination location) is on the common path, while the other is not, such as being located on a subpath that connects to the common path. For example, for determining a route from source location 330 to destination location 320, the source location 330 is addressed to or corresponds to subpath junction point 340, which in turn is addressed or corresponds to common junction point 350, which is on the common path 302. Destination location 320 is located on the common path. So the path connecting source location 330 to the common junction point 350 (i.e. 330 to 340 to 350) is combined with the path between location 320 and common junction point 350 to define the route from source location 330 to destination location 320. Stated in another way, subpath junction point 340 is the direct parent location or point to source location 330. As such, this may be the first junction point identified. It may then be determined whether subpath junction point 340 is on the common path. If not, there is another junction point that is identified, which could be a subpath junction point or a common junction point. Here, the next junction point identified on a route to the common path is common junction point 350, meaning that no other junction points may be identified, as the common path has been found. In some embodiments, however, there may be two or more subpath junction points that are identified before a common junction point is found. Each junction point may be referred to as a parent junction point, grandparent junction point, etc. A similar process would be performed if the source location was located on the common path 302 and the destination location was located on a subpath.

In a third scenario, both the source and destination locations are located on subpaths, not on the common path 302. In one situation, the source and destination locations are on different subpath sections of the predefined space, as is the case in the following description. For example, in determining a route from source location 360 to destination location 330, source location 360 is addressed or corresponds to common junction point 310, which is on the common path 302. Here, there are no subpath junction points between the source location 360 and the common junction point 310. Destination location 330 is addressed or corresponds to subpath junction point 340, which in turn is addressed or corresponds to common junction point 350, which is on the common path 302. The path connecting source location 360 to junction point 310 is combined with the path between location 330 to the common junction point 350 (i.e. 330 to 340 to 350) as well as the portion of the common path 302 between 310 and 350 to define the route from source location 360 to destination location 330.

In a fourth scenario, similar to the third scenario, both the source and destination locations are on subpaths, but unlike the third scenario, both locations have the same corresponding common junction point, as explained in more detail below. For example, in determining a route from source location 330 to destination location 370, it is determined that source location 330 is addressed or corresponds to subpath junction point 340, which in turn is addressed or corresponds to common junction point 350, which is on the common path 302. Destination location 370 is addressed or corresponds to subpath junction point 380, which is addressed or corresponds to subpath junction point 340, which is addressed or corresponds to common junction point 350, which is on the common path 302. Because common junction point 350 is part of the address for both the source location and the destination location, in one embodiment, common junction point 350 is eliminated from both paths. The remaining path from the source location (i.e., 330 to 340) is combined with the remaining path from the destination location (i.e., 370 to 380) to define the route from source location 330 to destination location 370 (i.e., 330 to 340 to 370 to 380.) In another embodiment, the common junction point 350 is not eliminated, but the path from subpath junction point 340 to common junction point 350 is eliminated from the provided route such that the route just includes 370 to 380 to 340 to 330. Any shared path is eliminated to avoid a user having to walk or otherwise be moved from subpath junction point 340 to common junction point 350, then back down to subpath junction point 340.

Figure 4:
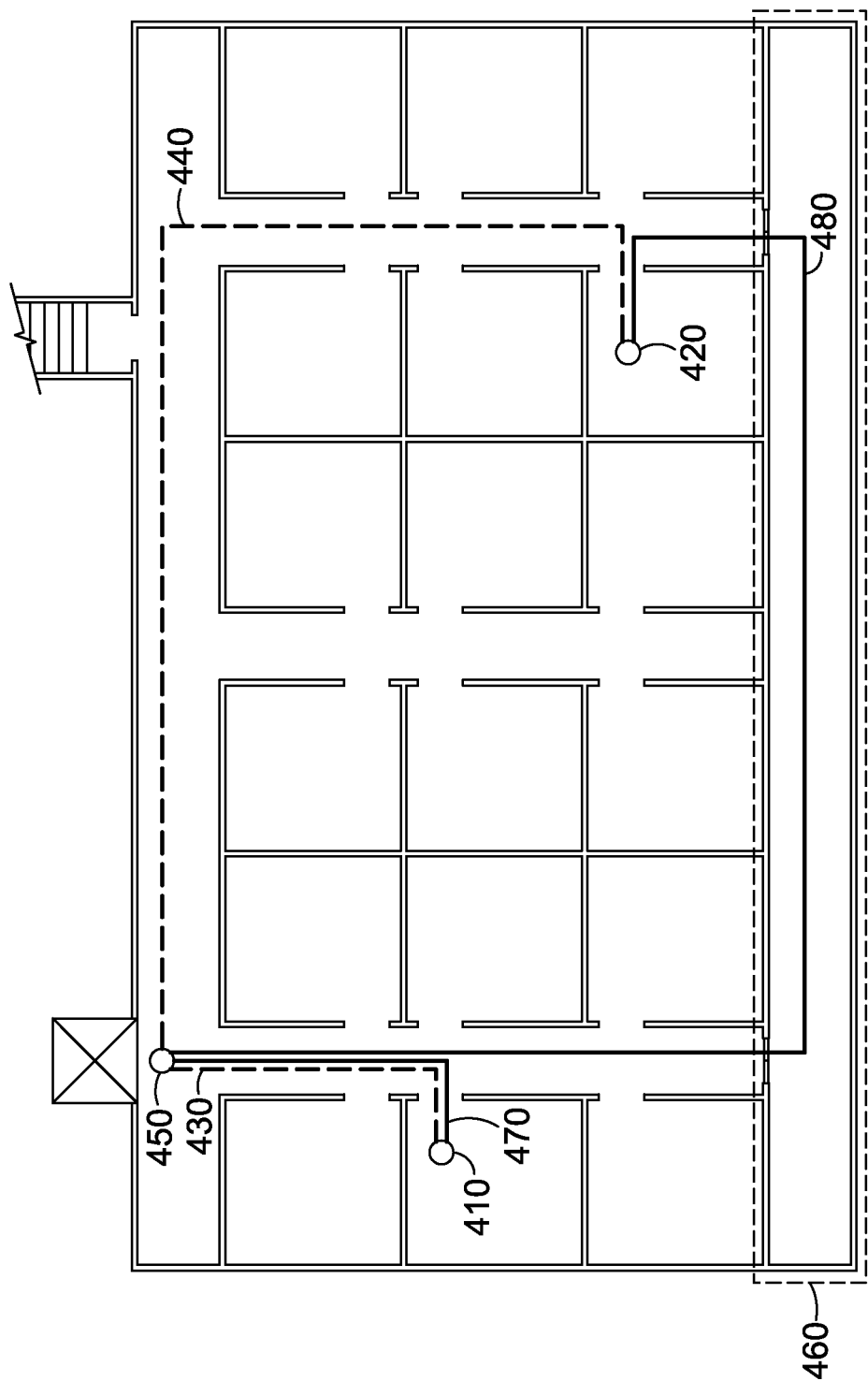
FIG. 4 is an exemplary visualization of a method of providing a route through a predefined space based on a user's security level, in accordance with an embodiment of the present invention.

FIG. 4 depicts an exemplary visualization of how the route from source location 410 to destination location 420 might be impacted by a user's security level. As explained before, for a standard user with a source location 410 and destination location 420, there exists a first path 430 and second path 440 which lead from the source location 410 and destination location 420, respectively, to the origin node 450. However, in the case that the user has an increased security clearance, the single path considered may pass through a security area 460 that is off-limits to a standard user. In such a case, there may be a first security path 470 and a second security path 480 leading from the source location 410 and the destination location 420, respectively, to the origin node 450. It will be appreciated that the application of embodiments of the present invention method would result in a different route between the source location 410 and the destination location 420 for a user having increased security clearance as compared to a standard user.

Figure 5A:
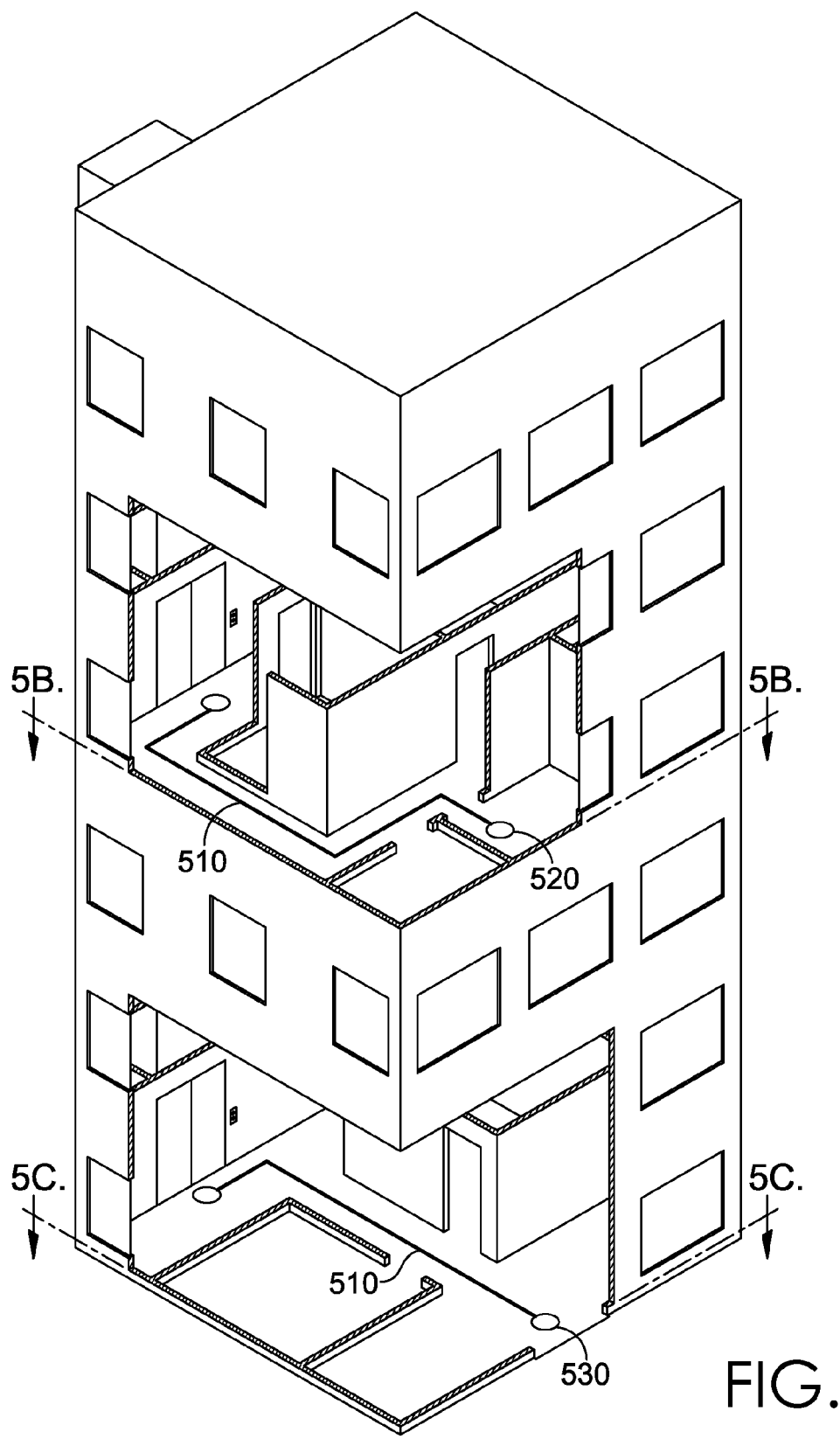
FIG. 5A is an exemplary visualization of a route which includes a transition location between vertical levels within a building, in accordance with an embodiment of the present invention.
Figure 5C:
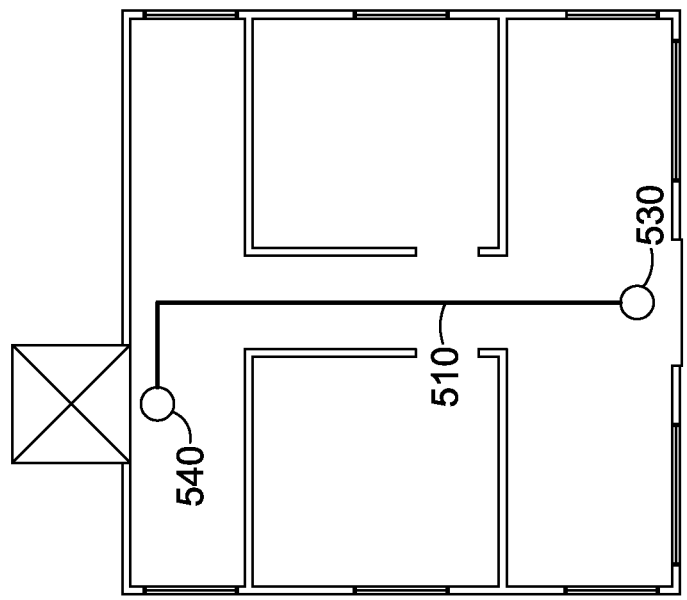
FIG. 5C is another sectional view of the route in FIG. 5A.
Figure 5B:
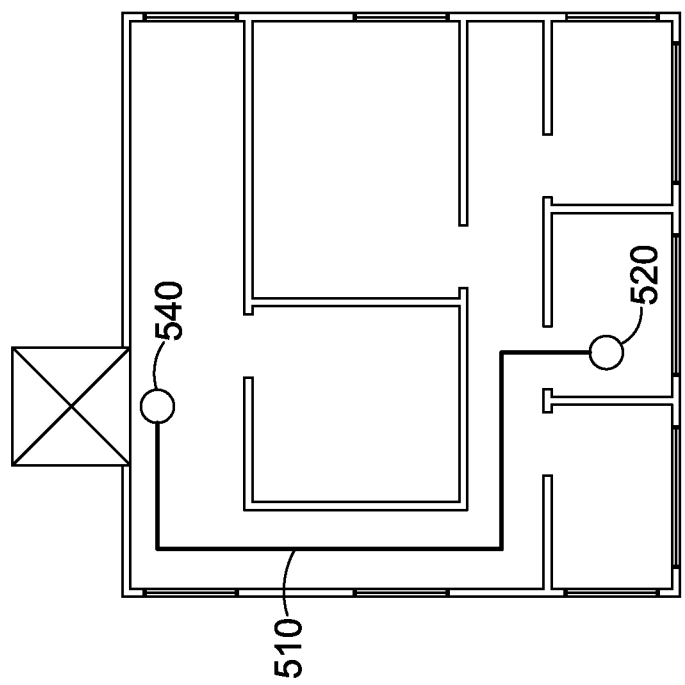
FIG. 5B is a sectional view of the route in FIG. 5A.

In one embodiment, the predefined space may be a multiple story building or facility including transition locations between stories. Examples of transition locations between vertical levels within a building may include elevators, stairwells, or escalators. FIGS. 5A-5C depict an exemplary visualization of a route that includes a transition location between vertical levels within a building. In one embodiment, there exists a route 510 between the source location 520 on one vertical level of a facility and the destination location 530 on a different vertical level of the facility which includes a transition location 540. It will be appreciated that routing through such transition locations could be generalized, for instance, to apply to source and destination locations within separate structures within a complex.

The source location can be provided by various means. The user may, for example, manually enter a source location into either their remote computing device 140 or through another input device connected to the input component 150 of the path determination engine 110. Alternatively, the source location can be received through the use of positioning technology, examples of which may include Global Positioning System (GPS), magnetic-fielding mapping, or Wi-Fi fingerprinting.

Figure 6:
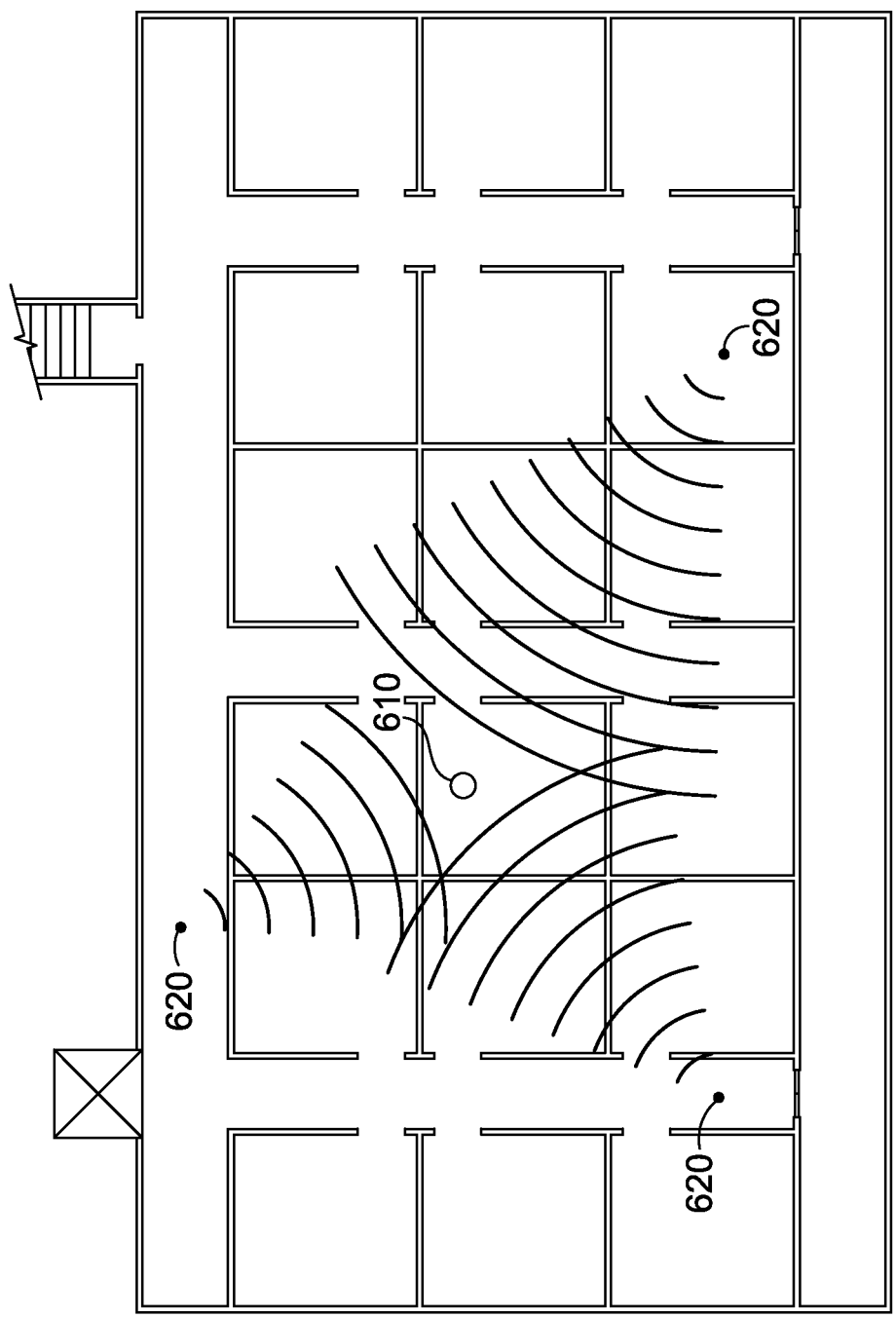
FIG. 6 is an exemplary visualization showing a source location determined by way of a user Wi-Fi fingerprint, in accordance with an embodiment of the present invention.

FIG. 6 illustrates an exemplary visualization of how the source location may be determined through the use of a Wi-Fi fingerprint. In one embodiment, a remote computing device would be located at the source location 610. The position of the remote computing device is determined by detecting the intensity of the receive signal strength (RSS) at the remote computing device from one or more wireless access points 620, resulting in a Wi-Fi fingerprint corresponding to the source location 610.

Figure 7:
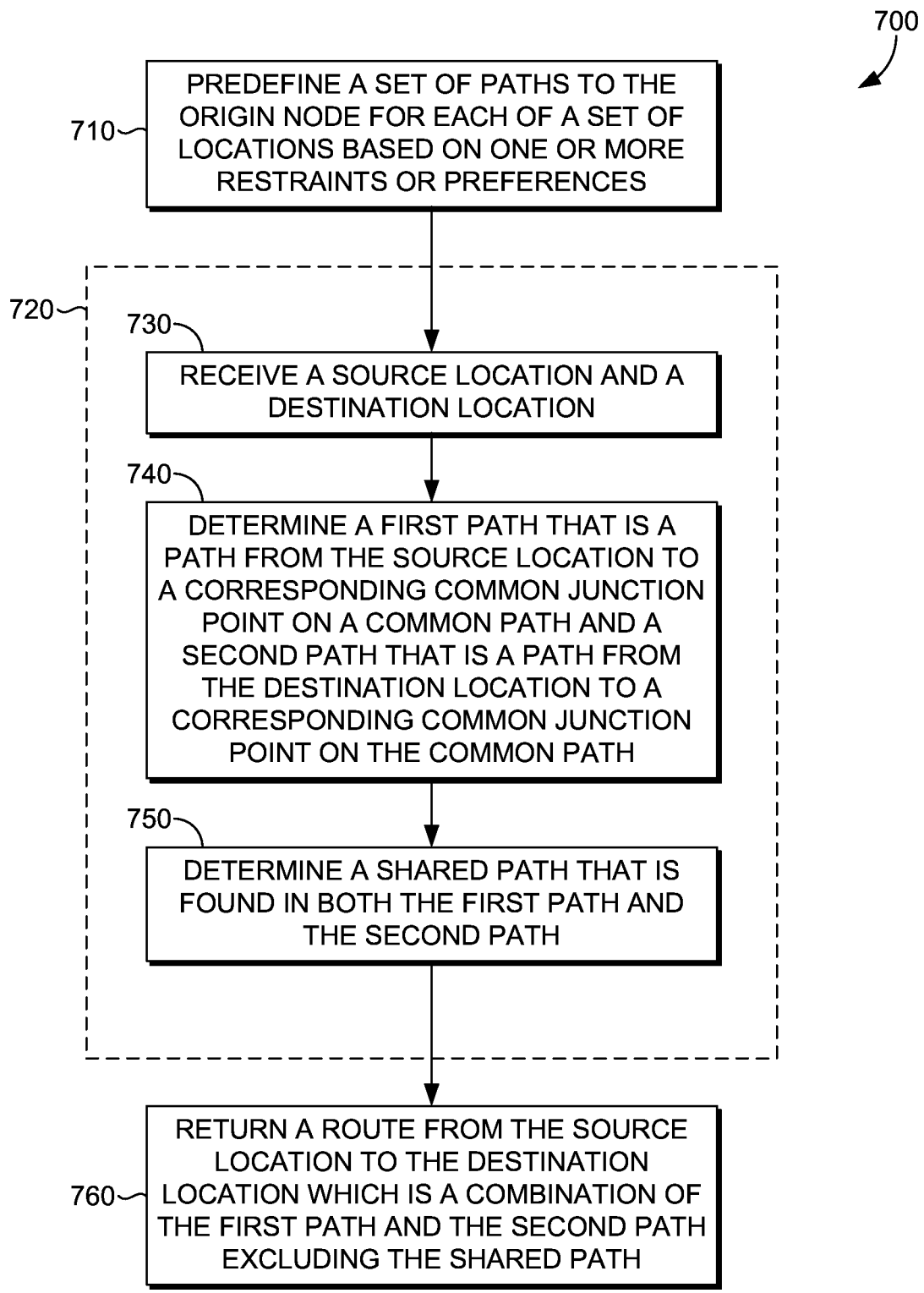
FIG. 7 is a flow diagram showing a method for providing a route through a predefined space, in accordance with an embodiment of the present invention.

Referring to FIG. 7, a flow diagram of a method 700 for providing a route through a predefined space is shown, in accordance with an embodiment of the present invention. Initially, at block 710, a set of paths for each locations of a set of locations based on one or more restraints or preferences is predefined. The restraints and/or preferences may be conditional or static. In embodiments, this set of paths may be processed in advance of a first request and retained in a data store 120 in order to save on processing time, or the set of paths may be defined at the time of the query in response to restraints or preference specific to a present request.

The path for a location returns to a corresponding common junction point. A corresponding common junction point, by definition, exists on the common path. For a location which is on the common path, its corresponding common junction point is the location itself. For a location on a child subpath, its corresponding common junction point is the common junction point of its parent subpath, or in some cases, its parent's parent subpath, and so on, until the common path is reached. Every location within the predefined space, no matter how near or far from the common path, corresponds to a corresponding common junction point.

At the time of a request, the method includes a subprocess 720 operative within the path determination engine 110. At block 730, a source location and a destination location are received. At block 740, a first path associated with the source location and a second path associated with the destination location are identified. At block 750, a shared path, which is part of both the first and the second paths, is determined.

At block 760, a route comprising the portion of the first path and the second path which excludes the shared path is returned. The route may be returned through output devices connected to the output component 170 of the path determination engine 110 or through one or more remote computing devices 140.

Figure 8:
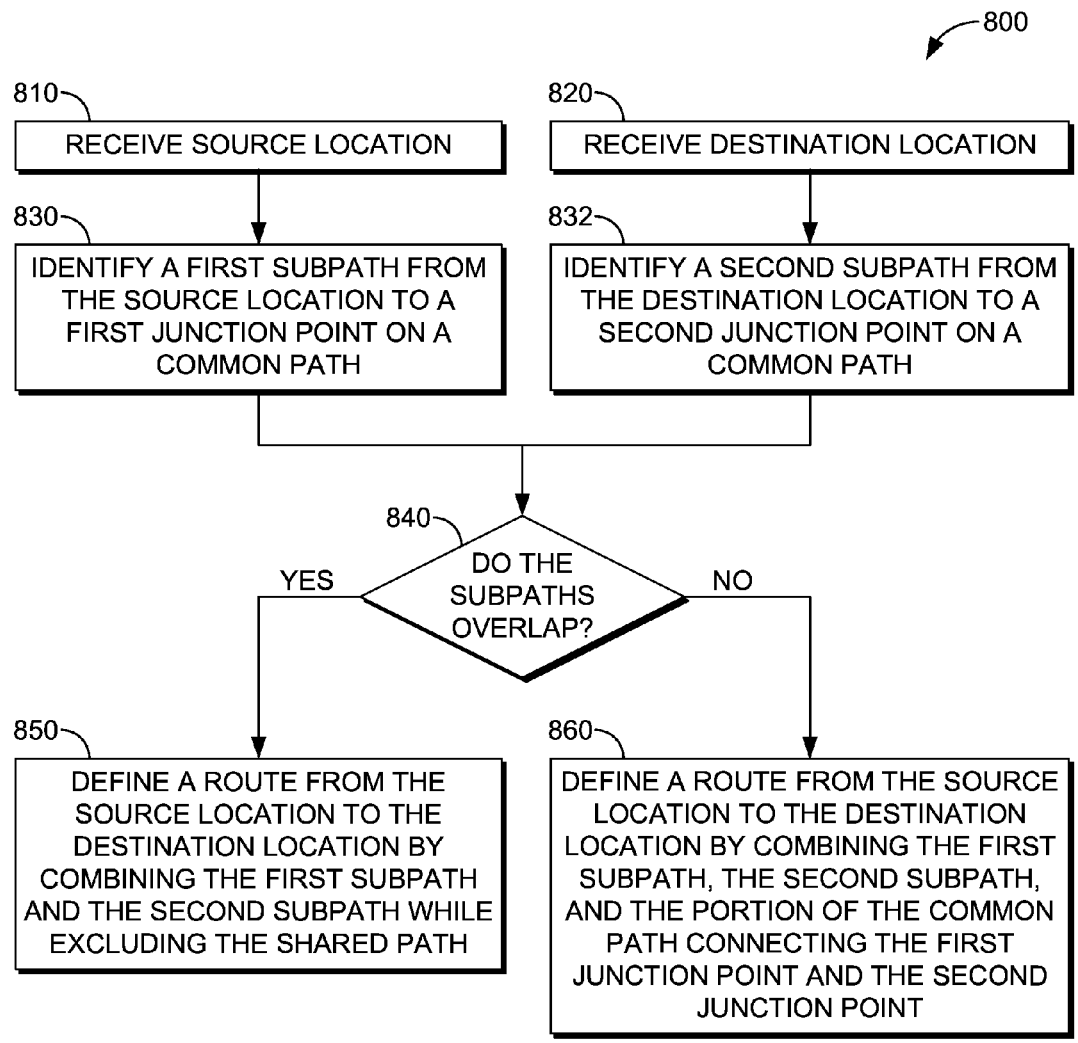
FIG. 8 is a flow diagram showing a method of providing a route through a predefined space, wherein locations are addressed to a common path and subpaths, in accordance with an embodiment of the present invention.

FIG. 8 is a flow diagram showing a method 800 form providing a route through a predefined space, wherein the locations are addressed to the common path and subpaths. The method 800 of FIG. 8 is from the perspective of a computing device, such as the path determination engine 110 of FIG. 1. Initially, at block 810, the source location is received and at block 820 the destination location is received. At block 830 a subpath from the source location to a first common junction point is identified. Likewise, at block 832, a subpath from the destination location to a second common junction point is identified. At decision point 840, it is determined if the two subpaths overlap at any point. If they do, at block 850, a route is defined by combining the two subpaths and excluding the portion of each that overlaps. If they do not, at block 860, a route is defined by combining the full subpaths and including the portion of the common path which separates the common junction points corresponding to each subpath.

Figure 9:
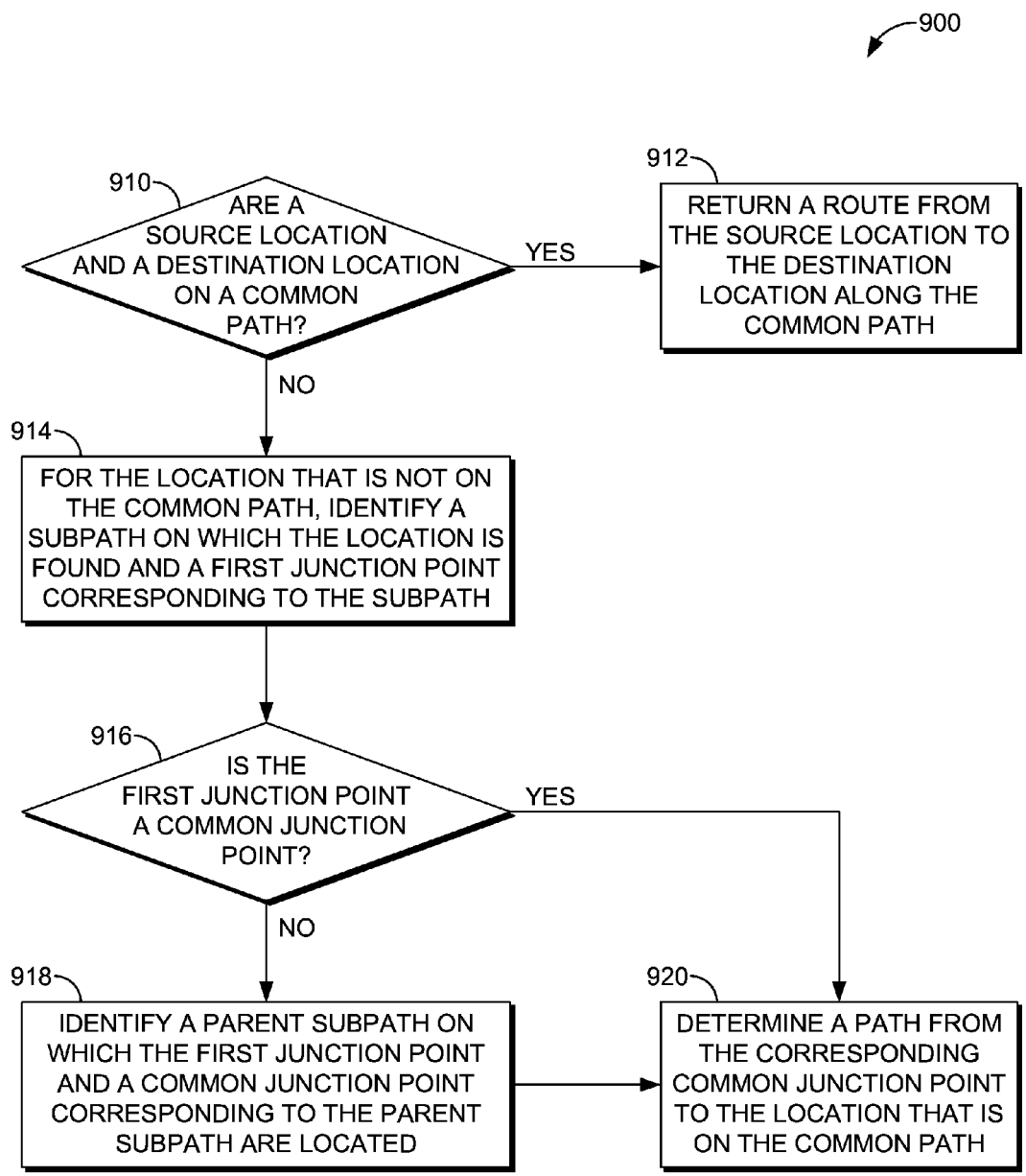
FIG. 9 is an alternative flow diagram showing a method of providing a route through a predefined space, wherein locations are addressed to a common path and subpaths, in accordance with an embodiment of the present invention.

FIG. 9 is an alternative flow diagram showing a method 900 of providing a route through a predefined space, wherein locations are addressed to a common path and subpaths. Having received a source location and a destination location, at decision point 910, the method determines if both points are on a common path. If so, at block 912, the method returns a route from the source location to the destination location along the common path. If not, this means that the location (could be the source or destination location) that is not on the common path is on a subpath. As discussed earlier, each subpath corresponds to a junction point with either the common path or with a parent subpath. At block 914, the subpath on which the location (either the source or destination location) is found is identified, as well as a first junction point. The first junction point is defined as the junction point corresponding to the subpath on which the location is found. This first junction point can either be a common junction point located on the common path or a subpath junction point location on a subpath.

At decision point 916, it is determined if the first junction point is a common junction point. If so, the first junction point is the corresponding common junction point to the location. In this case, the method goes directly to block 920, which determines the path from the corresponding junction point to the location found on the common path.

If the first junction point is not a common junction point, this means that the subpath on which the location is found is a child subpath (e.g., has a parent subpath) and the first junction point is a subpath junction point located on a parent subpath. Here, the method first goes to block 918 and identifies the parent subpath on which the first junction point is found as well as the corresponding common junction point for the parent subpath. A subpath could have multiple subpaths, such as more than one, more than two, etc. As such, there may be multiple subpath junction points on a particular subpath.

Figure 10:
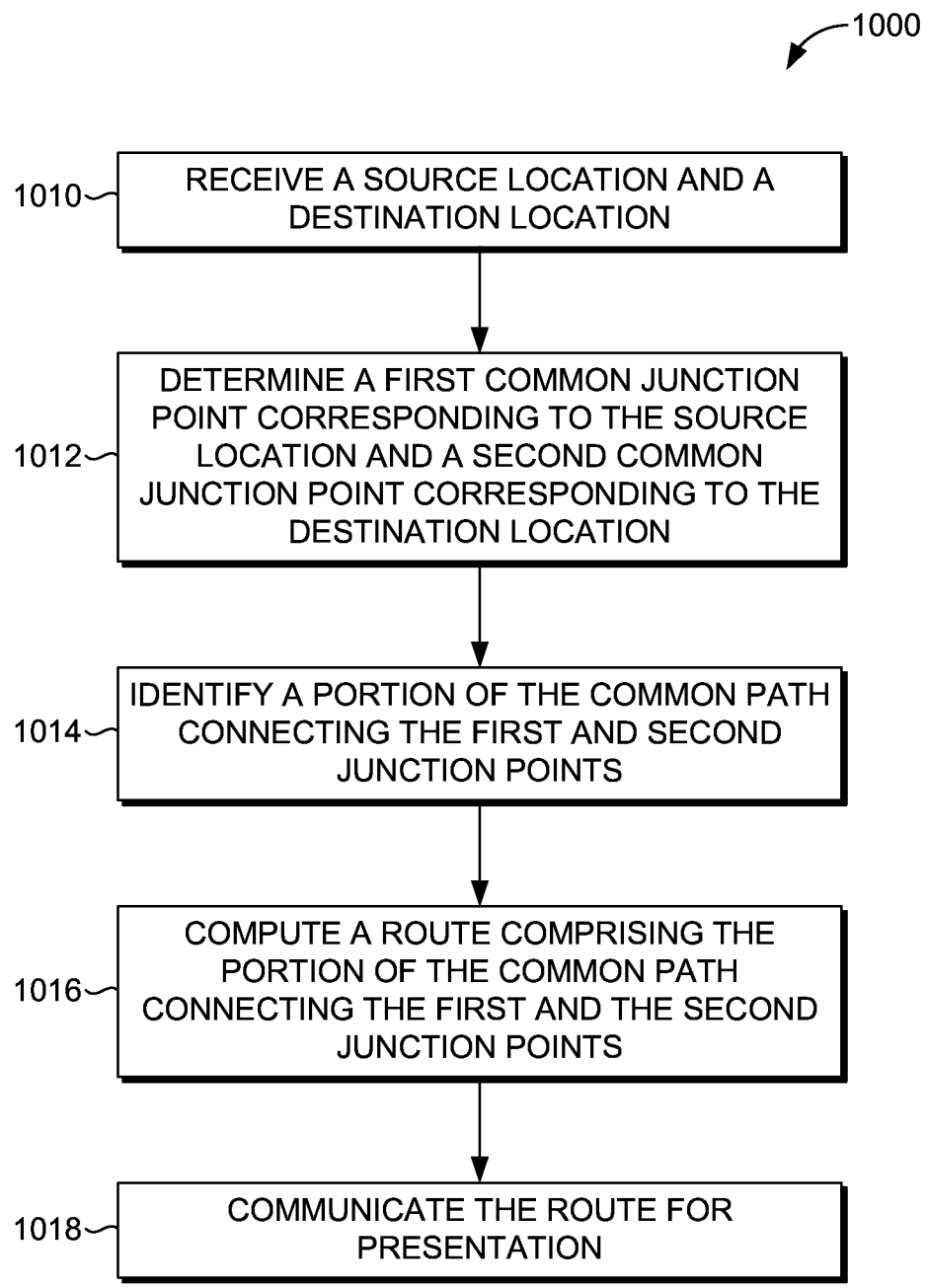
FIG. 10 is an alternative flow diagram showing a method of providing a route through a predefined space, wherein locations are addressed to a common path and subpaths, in accordance with an embodiment of the present invention.

FIG. 10 is an alternative flow diagram showing a method 1000 of providing a route through a predefined space, wherein locations are addressed to a common path and subpaths. At block 1010, a source location and a destination location are received from, for example, a user who wishes to be provided with a route to the destination location. At block 1012, a first common junction point corresponding to the source location and a second common junction point corresponding to the destination location are determined. At block 1014, the portion of the common path connecting the first and second junction points is identified. At block 1016, a route is computed that comprises the portion of the common path connecting the first and second common junction points. This computation may include, as mentioned, considering multiple factors, such as the user's security level, mode of transportation, any emergent conditions within the predefined area, etc. In embodiments, an algorithm is used to make this computation. At block 1018, the route is communicated for presentation to the user.

If the source location and the destination location are both found on the common path, the path returned will only contain the portion of the common path connecting the first and second junction points. If the at least one of the locations is located on a subpath, the route returned will be further comprised of the subpath. This subpath, as explained earlier, could be further composed of one or more child and parent subpaths.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. One or more non transitory computer storage media storing computer-useable instructions that, when used by one or more computing devices, cause the one or more computing devices to perform a method for providing directions through a predefined space, the method comprising:
 determining a common path comprising at least a common junction point;
 receiving a source location from among a set of locations via a computing device;
 receiving a destination location from among the set of locations via the computing device, wherein the source location and the destination location are remote from each other;
 determining,
  A) a first path starting from the source location to the common junction point, and
  B) a second path starting from the destination location to the common junction point;
 determining a shared path that is found in both the first path and the second path; and returning a route from the source location to the destination location which is a combination of the first path and-the second path excluding the shared path.

2. The media of claim 1, further comprising pre-defining paths from each of the set of locations within the predefined space such that for each location within the set of locations, only one path is defined from each location to a corresponding common junction point.

3. The media of claim 2, wherein the pre-defined paths from each of the set of locations within the predefined space are addressed in terms of a common path and one or more subpaths.

4. The media of claim 1, wherein the route returned references an ordered sequence of locations along the route.

5. The media of claim 1, wherein the determination of the first path and the second path is dependent on a user's security level.

6. The media of claim 1, wherein the determination of the first path and the second path is dependent on an existent emergency condition.

7. The media of claim 1, wherein the source location and the destination location are separated by one or more vertical levels.

8. The media of claim 7, wherein the route contains a transition location that allows the user to transition to one of the one or more vertical levels, wherein the transition location is one or more of an elevator, an escalator, or a staircase.

9. A system for providing directions through a predefined space comprising:
- a computing device, having a memory and one or more processors, configured to:
  - (A) receive a source location and a destination location from an input device, wherein the source location and the destination location are remote from each other,
  - (B) identify a first path starting from the source location to a common junction point, wherein the common junction point is located on a common path, and a second path starting from the destination location to the common junction point path, and
  - (C) determine a shared path that is that part of both the first path and the second path;
- a data store containing a path from each location to a corresponding common junction point on the common path; and
- an output device that returns a route from the source location to the destination location, wherein the route includes the first path and the second path but excludes the shared path.

10. The system of claim 9, wherein the route returned references an ordered sequence of the locations along the route.

11. The system of claim 9, wherein the computing device receives the source location by way of a user Wi-Fi fingerprint.

12. The system of claim 9, wherein the source location and the destination location are separated by one or more vertical levels, and wherein a transition location allows the user to transition to one of the one or more vertical levels.

13. The system of claim 12, wherein the route contains the transition location that allows the user to transition to one of the one or more vertical levels, wherein the transition location is one or more of an elevator, an escalator, or a staircase.

14. The system of claim 9, wherein the determination of the first path and the second path is dependent on a user's security level.

15. The system of claim 9, wherein the determination of the first path and the second path is dependent on an existent emergency condition.

16. A computerized method carried out by at least one server having at least one processor for determining a route through a predefined space, the method comprising:
- identifying, by the at least one processor, a first subpath starting from a source location to a junction point on a common path and a second subpath starting from a destination location to the junction point on the common path, wherein the source location and the destination location are remote from each other;
- determining, by at least one processor, an overlapping portion, if any, wherein the overlapping portion is a portion of the first path which overlaps a portion of the second path; and
- defining, by at least one processor, a route from the source location to the destination location by combining the first subpath and the second subpath and, if any, while excluding the overlapping portion.

17. The computerized method of claim 16, wherein the route is expressed as an ordered sequence of the locations along the route.

18. The computerized method of claim 16, wherein the source location and the destination location are separated by one or more vertical levels and a transition location allows the user to transition to one or more of the vertical levels.

19. The computerized method of claim 16, wherein at least one subpath from a location to a junction point on the common path comprises at least one child subpath from the location to a junction point, wherein the junction point connects the child subpath and a parent subpath.

20. The computerized method of claim 16, wherein the identification of the first subpath and the second subpath is based, at least, on a user's security level.

* * * * *

UNITED STATES PATENT AND TRADEMARK OFFICE
CERTIFICATE OF CORRECTION

PATENT NO. : 9,651,385 B2  
APPLICATION NO. : 14/861416  
DATED : May 16, 2017  
INVENTOR(S) : Kapil Raj Nair et al.

Page 1 of 1

It is certified that error appears in the above-identified patent and that said Letters Patent is hereby corrected as shown below:

In the Specification

In the Description:
Column 9 - Line 40: "on" should read --one--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*